US008819622B2

(12) United States Patent
Deneau (10) Patent No.: US 8,819,622 B2
(45) Date of Patent: Aug. 26, 2014

(54) ADDING SIGNED 8/16/32-BIT INTEGERS TO 64-BIT INTEGERS

(75) Inventor: Thomas M. Deneau, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1370 days.

(21) Appl. No.: 12/567,267

(22) Filed: Sep. 25, 2009

(65) Prior Publication Data

US 2011/0078653 A1    Mar. 31, 2011

(51) Int. Cl.
*G06F 9/44* (2006.01)

(52) U.S. Cl.
USPC ............................................ 717/106

(58) Field of Classification Search
USPC ............................................ 717/106
See application file for complete search history.

(56) References Cited

U.S. PATENT DOCUMENTS 5,809,306 A * 9/1998 Suzuki et al. ................. 717/143

OTHER PUBLICATIONS

Yung-Yu Chuang, "Intel x86 Instruction Set Architecture," Dec. 15, 2008.*

Bryant et al., "x86-64 Machine Level Programming," Sep. 8, 2008.*
Stallman, Richard M. and the GCC Developer Community, "GNU Compiler Collection Internals", (available at) http://gcc.gnu.org/onlinedocs/gccint.pdf.

* cited by examiner

*Primary Examiner* — Li B Zhen
*Assistant Examiner* — Lenin Paulino
(74) *Attorney, Agent, or Firm* — Volpe and Koenig, P.C.

(57) ABSTRACT

Disclosed are methods, apparatus, and computer-readable media for generating output computer code that adds a 64-bit integer to a smaller-length integer having a length of less than 64 bits. Input computer code includes a loop that includes adding a 64-bit integer and a smaller-length integer. Output code is generated that represents the input code in a format such as assembly language or machine code. The output code includes instructions to convert the smaller-length integer to a 64-bit integer, such that the conversion is not performed during each loop execution. The smaller-length integer is converted by subtracting an offset from the 64-bit integer, adding the offset to the smaller-length integer, and zero-extending the smaller-length integer. The offset is determined based on the length of the smaller-length integer. The output code preserves the integer semantics of the smaller-length integer as required by the input code.

11 Claims, 8 Drawing Sheets

400

CODE LISTING ONE

```
1. //a IS AN int [] (INTEGER ARRAY) WITH ALREADY-DEFINED CONTENTS
2. // THE VARIABLES stride, ref, AND i ARE ALL 32 BIT SIGNED INTEGERS
3. // HAVING ALREAD-DEFINED VALUES
4. // INTEGER i IS USED TO INDEX INTO a[]
5.
6. while (a[i] < ref){
7.     i=i + stride;
8. }
```

FIG. 1
PRIOR ART

CODE LISTING TWO

1. ;; THE ADDRESS FOR ARRAY a IS STORED IN rcx, A 64-BIT REGISTER
2. ;; INTEGER STRIDE IS STORED IN r9d, A 32-BIT REGISTER
3. ;; INTEGER i IS STORED IN edx, A 32-BIT REGISTER
4. top:
5.     add    edx, r9d    ;; ADDING STRIDE (r9d) TO i (edx, A 32-BIT REGISTER)
6.     movsxd rdx, edx    ;; MOVING i (IN edx) TO A 64-BIT REGISTER rdx
7.     cmp    dword ptr [rcx + rdx*4], r8d ;; INDEXING INTO a[] (rcx)
8.     jl     top         ;; GO BACK TO TOP OR TERMINATE LOOP

CODE LISTING THREE

```
1.  ;; A FIRST REGISTER (reg0) IS USED TO STORE THE OFFSET VALUE
2.  ;; A SECOND REGISTER (reg1) IS USED TO STORE THE 64-BIT INTEGER
3.  ;; A THIRD REGISTER (reg2) IS USED TO STORE THE SMALLER-LENGTH INTEGER
4.
5.  mov   reg0_{64}, offset    ;; PUT THE OFFSET VALUE IN REGISTER reg0
6.  sub   reg1_{64}, reg0_{64} ;; SUBTRACT THE OFFSET FROM THE 64-BIT VALUE
7.  add   reg2x, reg0x         ;; ADD THE OFFSET TO THE SHORTER-LENGTH VALUE
8.                             ;; THIS ADDITION ALSO ZERO-EXTENDS reg2
9.  loopstart:
10.   reg1_{64} + reg2_{64}    ;; ADD THE 64-BIT VALUE AND THE SHORTER-LENGTH VALUE
11.   jl loopstart             ;; END OF LOOP
```

CODE LISTING FOUR

```
1.  ;; THE ADDRESS ARRAY a IS STORED IN rcx, A 64-BIT REGISTER
2.  ;; INTEGER STRIDE IS STORED IN r9d, A 32-BIT REGISTER
3.  ;; INTEGER i IS STORED IN edx, A 32-BIT INTEGER
4.  ;; THE VALUE FOR THE OFFSET WILL BE STORED IN 64-BIT REGISTER rax
5.
6.  mov  rax,0x80000000              ;; STORE THE OFFSET (2^31) IN 64-BIT rax
7.  sub  rcx,rax                     ;; SUBTRACT OFFSET FROM ADDRESS FOR a[]
8.  add  edx,eax                     ;; 32-BIT ADDITION OF OFFSET, ZERO EXTENSION
9.  top:
10.     add  edx, r9d                ;; ADD stride (r9d) TO INTEGER i (IN edx)
11.     cmp  dword ptr [rcx + rdx*4],r8d  ;; INDEX INTO a[] (rcx)
12.     jl top                       ;; GO BACK TO TOP OR TERMINATE LOOP
```

ADDING SIGNED 8/16/32-BIT INTEGERS TO 64-BIT INTEGERS

TECHNICAL FIELD

The present disclosure relates to the generation of computer code that includes instructions for adding a 64-bit integer and a smaller-length integer.

BACKGROUND

Compilers are software programs that transform computer code in a source language into a different computer language. Many compilers are designed to take source computer code written in a high-level programming language, such as C or C++, and generate corresponding code in a lower-level language, such as assembly language. Assembly language code provides a close representation of the elemental machine language instructions that are executed by a processor.

In most 64-bit computing systems, to add a signed 8, 16, or 32-bit integer to a 64-bit integer, the smaller-sized integer must first be converted to 64 bits. This occurs, for example, during the execution of the instructions that correspond to the C code shown in Code Listing One 100 in FIG. 1.

Figure 1:
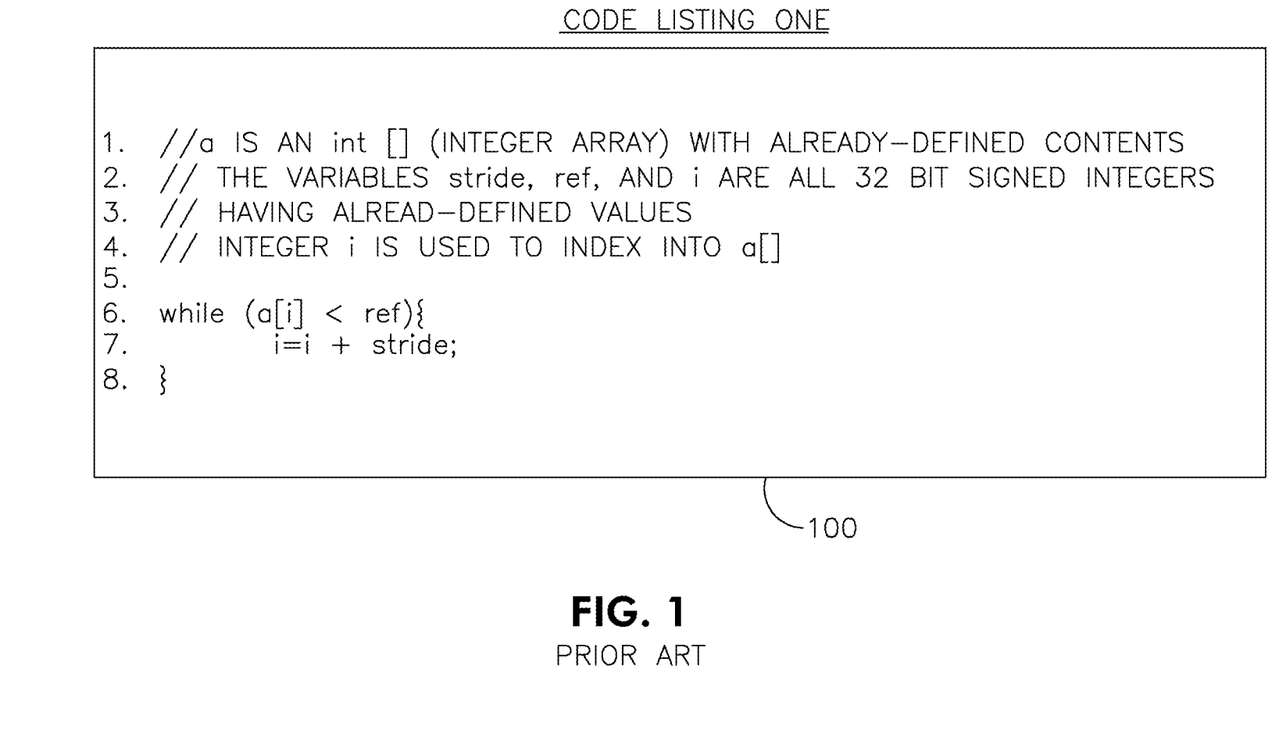
FIG. 1 shows example C code that includes a loop that includes an addition of a 64-bit integer and a 32-bit integer.

In Code Listing One 100, the comments in lines one through four explain how the variables shown in lines 6-8 are declared. Integer i is a signed 32-bit integer. Because 64-bit addressing is used in the example of Code Listing One 100, the address to integer array a is stored as a 64-bit value. To use integer i to index into array a, the value for i must be added to the address for array a during each execution of the while loop. Because a 32-bit value must be converted into a 64-bit value to be added to a 64-bit value, integer i must be converted to a 64-bit value during each execution of the while loop. This is reflected in further detail in Code Listing Two 200, shown in FIG. 2.

Figure 2:
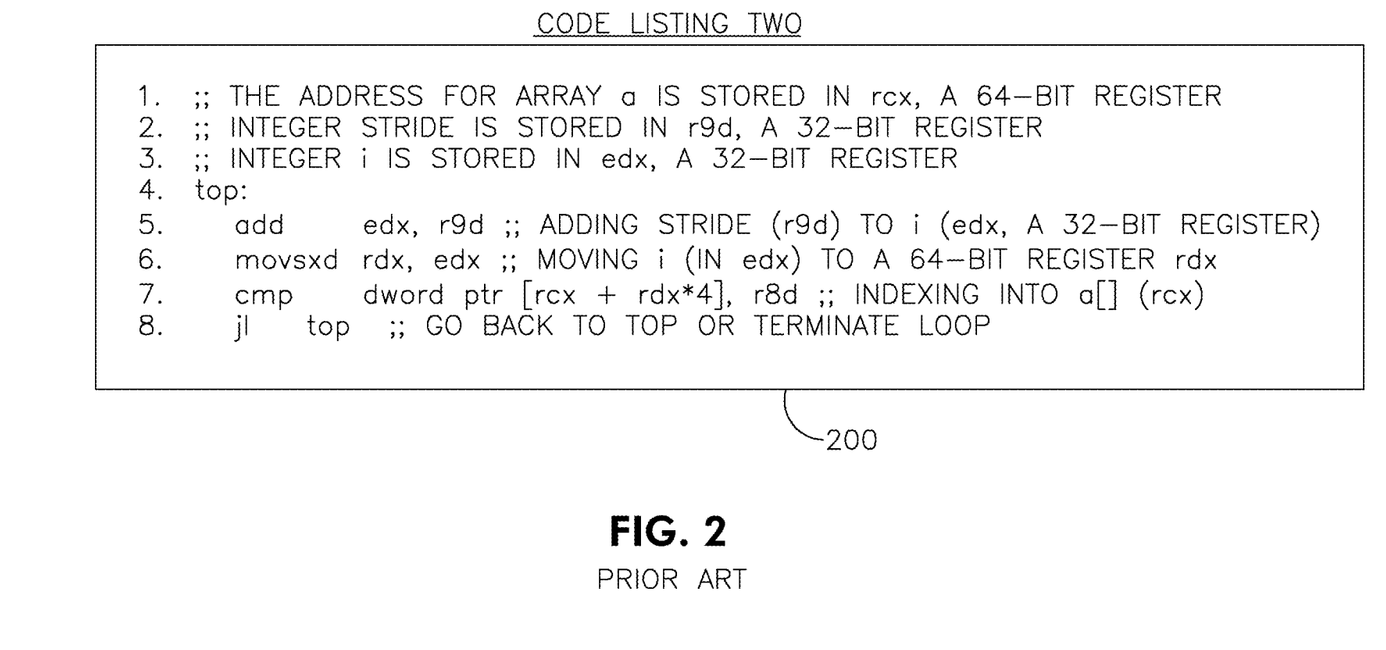
FIG. 2 shows assembly code that corresponds to the C code of FIG. 1.

Code Listing Two 200 shows AMD64 assembly code that corresponds to the while loop shown in Code Listing One 100. Lines one through three of Code Listing Two 200 include comments that explain which registers are used to store values that correspond to the variables shown in Code Listing One 100. In line five, a 32-bit addition operation is performed to add the value for signed integer stride (stored in 32-bit register r9d) to the signed integer i (stored in 32-bit register edx). In line six, the movsxd instruction moves the value for signed integer i (stored in register edx) to 64-bit register rdx. The movsxd instruction also sign-extends the most significant bit of the integer i value as stored in edx into the upper 32 bits of rdx. In line seven, the signed 64-bit value of integer i (stored in rdx) is multiplied by four. Four is a scale factor used in this instance because each element of array a is a four-byte (32-bit) integer. The product of this multiplication is then added to the 64-bit base address for array a (stored in rcx). The sum of this addition operation is used as the input address to the memory reference portion ("dword ptr") of the cmp instruction. The cmp instruction compares the referenced element of array a to the value for integer ref (stored in 32-bit register r8d). In line eight, the jl instruction either terminates the loop or returns the instruction flow to the top of the loop (line four), based on the outcome of the cmp instruction.

Integer wraparound semantics (also referred to as "overflow" semantics) define how an integer behaves when its value is set such that it would exceed its maximum possible value or go below its minimum possible value. According to common integer semantics, adding 1 to an integer when its value is at its maximum possible value will result in the integer being set to its minimum possible value. Similarly, subtracting 1 from an integer when its value is at its minimum possible value will result in the integer being set to its maximum possible value. Most computer language specifications define integer wraparound semantics. Compilers are designed to generate target code that reflects the integer wraparound semantics specified in the source code.

In most computing systems, signed integers are stored using two's complement representation. Using binary positional notation, each bit in a sequence of bits that is allocated to store a number has a weight which is a power of two. The weights increase from right to left. For example, in the binary sequence 0001, the 1 has a weight of 1; in the sequence 0010, the 1 has a weight of 2; in 0100, the 1 has a weight of 4; and so on. In two's complement representation, the most significant bit (the bit furthest to the left in the sequence) has a negative weight. For example, in two's complement representation the sequence 0111 has a decimal value of 7, and the binary sequence 1111 has a decimal value of −1. Binary sequence 1111 has a decimal value of −1 because, according to two's complement representation, the most significant bit in the sequence has a value of −8. When −8 is added to the value of +7 represented by the three least significant bits in the sequence, the resulting value for the sequence is −1.

For a signed N-bit integer in two's complement representation, the maximum value that the integer can represent is $2^{N-1}-1$. The minimum value that a signed N-bit integer can represent is $-2^{N-1}$. An N-bit two's-complement numeral system can therefore represent every integer in the range $-2^{N-1}$ to $+2^{N-1}-1$.

For unsigned integers, no bits are required to represent a sign. Therefore, every bit used to represent the value of an unsigned integer can be used to represent magnitude. The minimum value unsigned integers can represent is 0, and the maximum value that an unsigned N-bit integer can represent is $2^N-1$.

Figure 3:
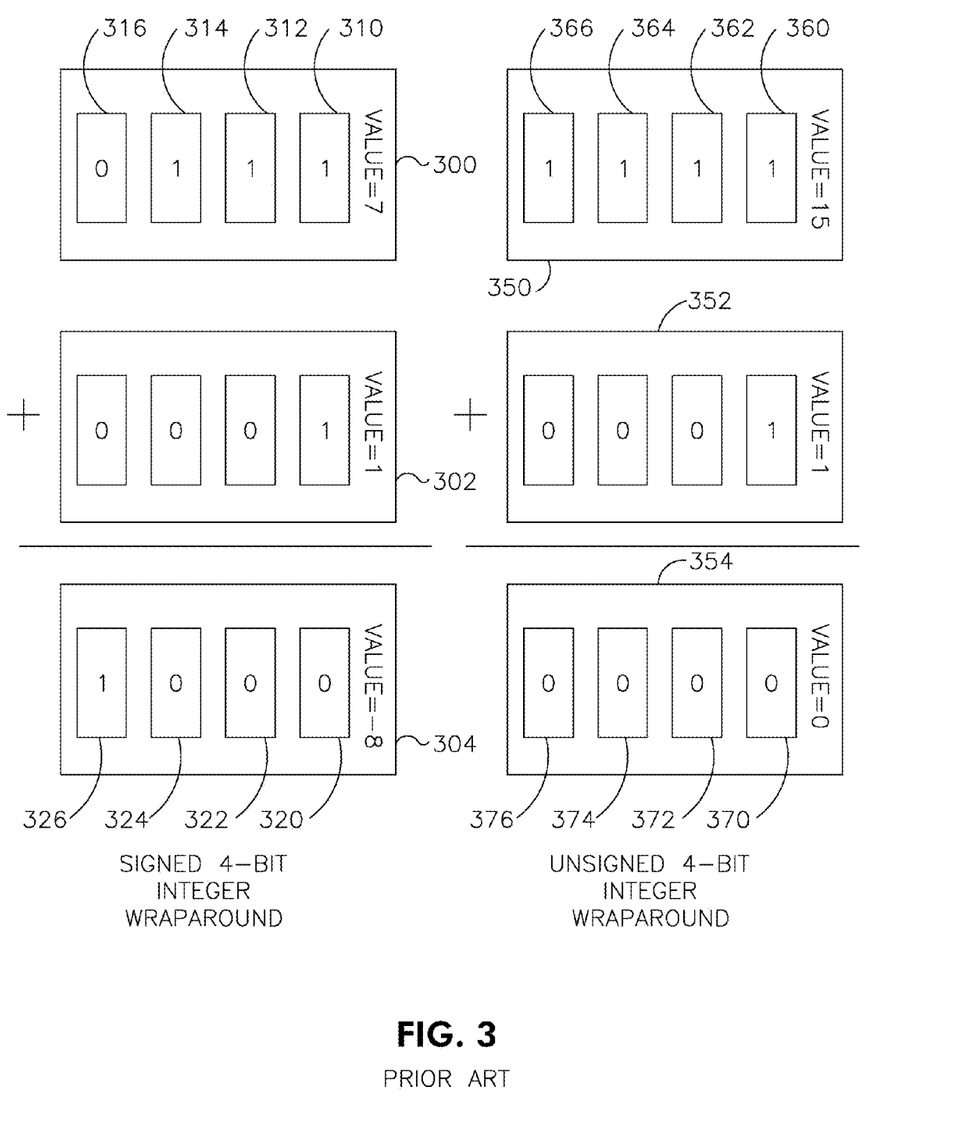
FIG. 3 shows integer wraparound behavior in signed 4-bit and unsigned 4-bit integers.

As signed and unsigned integers of the same bit size have different maximum and minimum values, signed and unsigned integers of the same bit size have different wraparound semantics. To illustrate this, FIG. 3 shows integer wraparound behavior in signed 4-bit and unsigned 4-bit integers. Integer 300 is a 4-bit signed integer made up of bits 310, 312, 314, 316. Bit 316 is the most significant bit of integer 300 and bit 310 is the least significant bit of integer 300. The other integers in FIG. 3 (302, 304, 350, 352, and 354, discussed in further detail below) are arranged with the same layout as integer 300, with their most significant bit to the left and their least significant bit to the right.

Integer 300 stores numbers according to two's complement representation. As shown in FIG. 3, the binary value for integer 300 is 0111 (which is 7 in decimal). This is the maximum value that a 4-bit signed integer can represent using two's complement representation.

Integer 302 is also a signed 4-bit integer that uses two's complement representation. The least-significant bit of integer 302 is set to 1 while all of the other bits of integer 302 are set to 0, giving integer 302 a value of 0001 as represented in binary and 1 in decimal. Performing a binary addition of integer 300 and integer 302 results in the binary value of 1000, which is shown in bits 320, 322, 324, 326 of integer 304. Integer 304 is also a signed 4-bit integer that uses two's complement representation. According to two's complement representation, the binary value 1000 indicates decimal value −8. This shows that adding 1 to the maximum possible value stored in a signed 4-bit integer (+7) results in a wrap around to −8, which is the minimum possible value that a signed 4-bit integer is capable of representing using two's complement representation.

Integer 350 is an unsigned 4-bit unsigned integer and shows different wrap around/overflow behavior from signed integers 300, 302, 304. Each of the bits 360, 362, 364, 366 of integer 350 is set to 1, giving integer 350 a decimal value of 15. This is the maximum value that a 4-bit unsigned integer can represent.

Integer 352 is a signed 4-bit integer that uses two's complement representation. The least-significant bit of integer 352 is set to 1 while all of the other bits of integer 352 are set to 0, giving integer 352 a value of 1.

Performing a binary addition of integer 350 and integer 352 results in a value of 0. This result is shown as a 0 in each of bits 370, 372, 374, and 376 of integer 354. Integer 354 is an unsigned 4-bit integer. Zero is the lowest value that an unsigned 4-bit integer is capable of representing. This shows that adding 1 to the maximum possible value stored in an unsigned 4-bit integer (+15) results in a wrap around to 0, which is the minimum possible value that an unsigned 4-bit integer is capable of representing.

As shown in FIG. 3, signed 4-bit integers wrap around from $2^3-1$ to $-2^3$, while unsigned 4-bit integers wrap around from $2^4-1$ to 0. According to the same principles, signed 32-bit integers wrap around from $2^{31}-1$ to $-2^{31}$, and unsigned 32-bit integers wrap around from $2^{32}-1$ to 0. Expressed in hexadecimal form, signed 32-bit integers wrap around from 0x7fffffff to 0x80000000, and unsigned 32-bit integers wrap around from 0xffffffff to 0x0.

The above-described integer wraparound semantics are preserved when, for example, a compiler generates the assembly code of Code Listing Two 200 from the C code of Code Listing One 100. In Code Listing Two 200, the movsxd instruction of line six is necessary to convert the 32-bit integer (integer i) to a 64-bit integer so as to perform the 64-bit addition inside the loop. To make execution of the loop more efficient, it would be desirable to change the code such that the conversion to 64 bits is not performed during every loop execution. However, no such solutions are available in the current technology. Therefore, a new approach is required for improving the efficiency of loops that include addition of a 64-bit integer and a smaller-length integer, while correctly preserving integer wraparound semantics.

SUMMARY

A processor-executable method generates output computer code that includes instructions for adding a 64-bit integer and a signed smaller-length integer having a length less than 64 bits. The method includes identifying a loop construct in source computer code. The loop construct includes instructions for adding the 64-bit integer and the smaller-length integer. The output code is generated based on the source computer code. Instructions in the output code, when executed, subtract an offset from a first register that corresponds to the 64-bit integer, add the offset to a second register that corresponds to the smaller-length integer, and perform a zero extension to the second register. Further instructions in the output code, when executed, iterate through a loop that includes a 64-bit addition of the values in the first register and the second register.

An apparatus generates output computer code that includes instructions for adding a 64-bit integer and a signed smaller-length integer having a length less than 64 bits. The apparatus includes a processor that is configured to identify a loop construct in source computer code. The loop construct includes instructions for adding the 64-bit integer and the smaller-length integer. The processor is further configured to generate output code based on the source computer code. Instructions in the output code, when executed, subtract an offset from a first register that corresponds to the 64-bit integer, add the offset to a second register that corresponds to the smaller-length integer, and perform a zero extension to the second register. Further instructions in the output code, when executed, iterate through a loop that includes a 64-bit addition of the values in the first register and the second register.

A computer-readable medium stores a set of instructions for generating output computer code that adds a 64-bit integer and a signed smaller-length integer having a length less than 64 bits. The set of instructions includes an identifying segment for identifying a loop construct in source computer code. The loop construct includes instructions for adding the 64-bit integer and the smaller-length integer. The set of instructions further includes a generating segment for generating the output computer code based on the source computer code. Instructions in the output code, when executed, subtract an offset from a first register that corresponds to the 64-bit integer, add the offset to a second register that corresponds to the smaller-length integer, and perform a zero extension to the second register. Further instructions in the output code, when executed, iterate through a loop that includes a 64-bit addition of the values in the first register and the second register.

BRIEF DESCRIPTION OF THE DRAWINGS

A more detailed understanding may be had from the following description, given by way of example in conjunction with the accompanying drawings wherein.

DETAILED DESCRIPTION

Described in detail hereafter are methods, apparatus, and computer-readable media for generating output computer code that includes adding a 64-bit integer to a signed smaller-length integer. Input computer code includes a loop that includes adding a 64-bit integer and a smaller-length integer. Output computer code is generated that represents the input computer code as assembly language, machine code, or in another format. In the output computer code, instructions are performed prior to executing loop to convert the smaller-length integer to a 64-bit integer. This removes the need to sign-extend the smaller-length integer to a 64-bit integer during every execution of the loop. The instructions that convert the smaller-length integer include subtracting an offset from the 64-bit integer, adding the offset to the smaller-length integer, and zero-extending the smaller-length integer. The offset is determined based on the length of the smaller-length integer. The conversion of the smaller-length integer preserves the integer semantics of the smaller-length integer as required by the input computer code.

As used hereafter, the term "processor" includes, but is not limited to, a single-core or multi-core general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine. As used hereafter, the term "computer-readable medium" includes, but is not limited to, a cache memory, a read-only memory (ROM), a semiconductor memory device such as a Dynamic Random Access Memory (D-RAM), Static RAM (S-RAM), or other RAM, a magnetic medium such as a flash memory, a hard disk, a magneto-optical medium, an optical medium such as a CD-ROM, a digital versatile disk (DVD), or Blu-Ray disc (BD), other volatile or non-volatile memory, or electronic data storage device.

As used hereafter, each of the terms "computer code," "source computer code," "source code," "output computer code," and "output code" includes but is not limited to code describing one or more processor-executable instructions, expressed in a format such as a high-level programming language, low-level programming language, bytecode, machine language, or any other format capable of representing processor-executable instructions.

Figure 4:
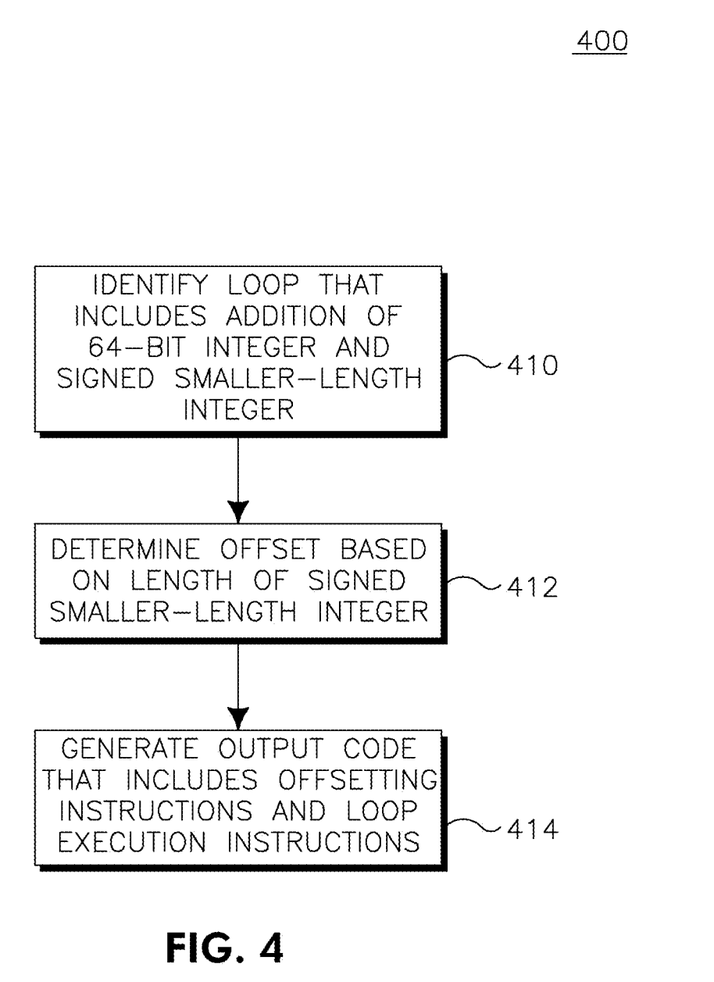
FIG. 4 shows processor-executable method for generating output computer code from source code, the output computer code including instructions for adding a 64-bit integer and a signed smaller-length integer.

FIG. 4 shows a processor-executable method 400 for generating output computer code from source code, wherein the output computer code includes instructions for adding a 64-bit integer and an integer of a smaller length. The source code is analyzed and at least one processor identifies a loop construct that includes adding a 64-bit integer and a signed smaller-length integer (having less than 64 bits) (step 410). Identifiable loop constructs include a for loop, while loop, do-while loop, count-controlled loop, condition-controlled loop, collection-controlled loop, or any other construct that indicates the repetition of one or more instructions. Identification of the loop construct may include, for example, the execution of one or more instruction for parsing the loop construct. Identification of the loop construct may include but is not limited to the execution of one or more instructions related to a data structure that represent the loop construct, such as a parse tree, abstract syntax tree, other type of data structure, or portion thereof. The source code may be written in a high-level language such as C, C++, Java, Perl, Python, or other language.

The at least one processor determines an offset based on the length of the smaller-length integer (step 412). The offset is determined based on the length of the signed smaller-length integer so as to preserve the integer semantics that pertain to the smaller-length integer. For example, a 32-bit signed integer wraps around at its maximum value ($2^{31}-1$) to its minimum value ($-2^{31}$). An unsigned integer wraps around at its maximum value ($2^{32}-1$) to its minimum value (0). Therefore, the difference between when a signed integer wraps around and when an unsigned integer wraps around is $2^{31}$ (which is 2,147,483,648 in decimal and 0x80000000 in hexadecimal). By using this difference ($2^{31}$) as the offset to increase the shorter-length 32-bit integer and decrease the 64-bit integer, the wraparound semantics for the shorter-length integer are preserved during the loop. The difference between when a signed 16-bit integer wraps around and when an unsigned 16-bit integer wraps around is $2^{15}$ (which is 32,768 in decimal and 0x8000 in hexadecimal). Accordingly, an offset of $2^{15}$ is used when the shorter-length integer is a 16-bit integer. Applying the same principles, an offset of $2^7$ (which is 128 in decimal and 0x80 in hexadecimal) is used when the shorter-length integer is an 8-bit integer.

The at least one processor generates output computer code based on the source code (step 414). The output code that is generated includes instructions described by the pseudo-code of Code Listing Three 500 of FIG. 5 as described in further detail below. Generation of the output code may include but is not limited to the execution of one or more instructions related to the instantiation and/or processing of one or more data structures that represent the semantics of the output computer code. Alternatively or additionally, the at least one processor may store the generated output code in one or more computer-readable media.

Figure 5:
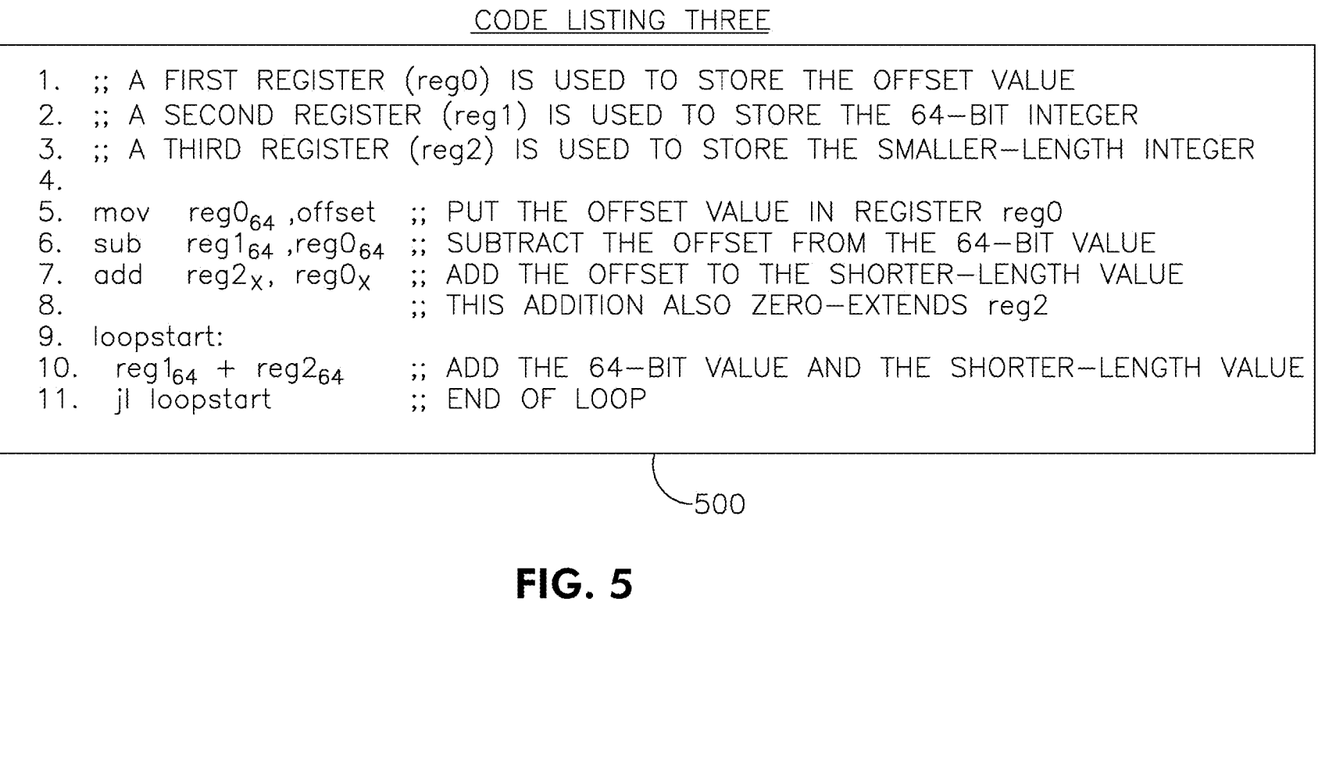
FIG. 5 shows pseudo-code that illustrates the output computer code generated by the method of FIG. 4.

Referring to FIG. 5, in the instructions described by Code Listing Three 500, the operation of line five puts the offset value into reg0, wherein reg0 is referenced as a 64-bit register. In some assembly instruction sets, a 64-bit register can be addressed as a 64-bit register or as a register of a smaller size. When a 64-bit register is referenced as a register of a smaller size, only the bits that are included in the smaller size can be affected. In AMD64 assembly language, for example, register rax is a 64-bit register, but the 32 least significant bits of rax are mapped to 32-bit register eax. Assembly code can be written that indicates 32-bit operations involving eax; such operations, when executed, affect the 32 least-significant bits of rax. In line five of Code Listing Three 500, the mov instruction references reg0 as a 64-bit register, which is indicated by the subscript in the text "$reg0_{64}$."

In line six of Code Listing Three 500, the offset value (stored in reg0) is subtracted from the identified 64-bit value. This instruction references reg0 and reg1 as 64-bit registers. This is indicated by the subscripts in the text "$reg1_{64}$" and "$reg0_{64}$." In line seven, the offset value (stored in reg0) is added to the value of the shorter length (stored in reg2). Line seven uses "X" in the subscripts in the text "$reg2_X$" and "$reg0_X$" to indicate that the register size that is used to reference reg2 and reg0 may vary. If the shorter-length value is a 32-bit integer, reg2 and reg0 may referenced as 32-bit registers and the addition of the values in reg2 and reg0 will be a 32-bit operation. Similarly, for other possible smaller integer lengths (such as 16-bit, 8-bit, or smaller), reg2 and reg0 may be referenced as having a length equal to the length of the shorter-length integer.

After the value of reg2 is set in line seven, a zero extension is performed on reg2. In this context, a zero extension involves setting all of the upper bits of a register (those bits which were inaccessible when the register was accessed as a 32-, 16-, or 8-bit register) to 0. For example, if reg2 is accessed as a 32-bit register in line six, a subsequent zero extension sets the most significant 32 bits to 0. In some contexts, zero extensions are performed automatically after a register value is set, requiring no additional explicit instructions. Line seven of Code Listing Three 500 should be read as including an implicit zero extension of reg2. In a pseudo-code format that did not include an implicit zero extension in line seven, Code Listing Three 500 would include an explicit instruction to zero-extend reg2 after the addition of line seven is performed.

Line nine of Code Listing Three 500 indicates the beginning of the loop. In line ten, reg1 and reg2 are referenced as 64-bit registers and a 64-bit addition operation is performed. In line ten, the jl instruction either terminates the loop or returns the instruction flow to the top of the loop (line nine).

Referring to both FIGS. 4 and 5, additional code may be generated in step 414 and included in the output code in addition to the pseudo-code reflected in Code Listing Three 500. The result of the addition operation of line ten of Code Listing Three 500, for example, may be used as input to another operation. The other operation may be an instruction to assign the resulting value to a register, may be a mathematical or logical operator, or may be any other operation that can receive the result of the addition as an input. Further, additional code may be generated in step 414 and may be included in the output code for execution before, after, and/or during the loop, such that the instructions indicated in the input source code are reflected in the output code. This additional code may include one or more instructions related to loop termination, control flow related to the loop, and/or reflect any other instructions indicated in the input source code.

In the loop shown in Code Listing Three 500, there is no instruction equivalent to the movsxd instruction shown in Code Listing Two 200. As described above, the movsxd instruction was required in Code Listing Two 200 to properly convert the smaller-length integer (in Code Listing Two 200, integer i) to a 64-bit integer so that the addition could be performed. In Code Listing Three 500, the conversion is accomplished instead by performing the offsetting shown in lines six and seven and by zero-extending the smaller-length integer as implicitly indicated in line seven.

Although Code Listing Three 500 shows pseudo-code similar to the format of AMD64 assembly code, the output code that is generated in step 414 may be in various formats in various implementations. For example, the output code may be generated as AMD64 assembly language, assembly language other than AMD64 assembly language, machine code, or computer code in any format capable of representing the semantics described by Code Listing Three 500. Further, although FIGS. 4 and 5 describe the addition of a smaller-length integer with a longer-length integer of 64-bit integers, the principles illustrated by FIGS. 4 and 5 are equally applicable to longer-length integers of less than 64 bits. For example, the above-described principles may be used, mutatis mutandis, for the addition of a 4-bit or 8-bit signed integer to a 16-bit integer, or for the addition of a 4-bit, 8-bit, or 16-bit integer to a 32-bit integer.

The order of the instructions shown in Code Listing Three 500 is provided purely by way of example. The instructions generated in step 414 may be indicated in the output code such that they may be executed in any order, including concurrently, without departing from the principles described above with reference to FIGS. 4 and 5.

Figure 6:
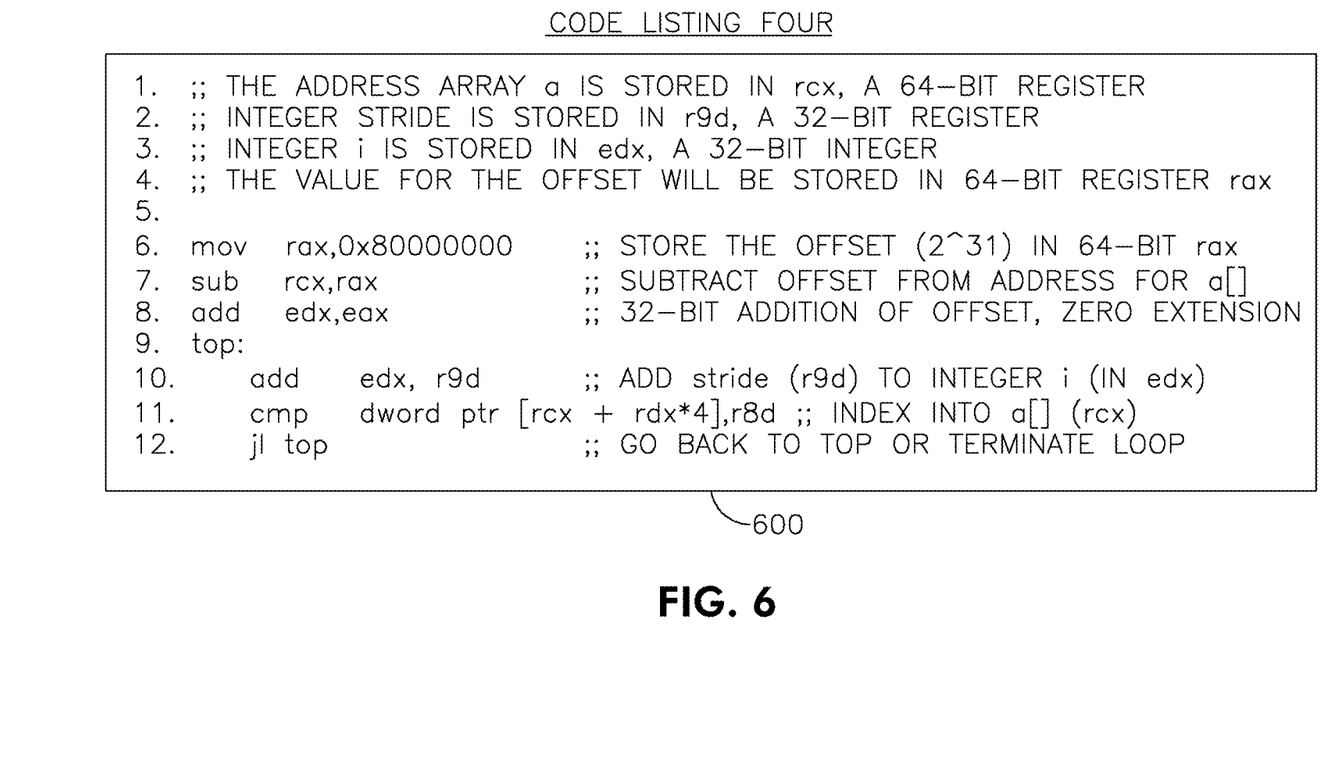
FIG. 6 shows assembly code that may be generated by applying the method of FIG. 4 to the example C code of FIG. 1.

FIG. 6 shows Code Listing Four 600, which shows example AMD64 assembly code that may be generated by applying the method 400 of FIG. 4 to the source code of Code Listing One 100. Lines one through four of Code Listing Four 600 include comments that explain which registers are used to store values that correspond to the variables shown in Code Listing One 100. In line six of Code Listing Four 600, the mov instruction puts the offset value (0x80000000 in hexadecimal; $2^{31}$ in decimal) into 64-bit register rax. In line seven, the offset value is subtracted from the address for array a (stored in 64-bit register rcx). In line eight, a 32-bit addition is performed to add the offset value to integer i (stored in 32-bit register edx). After the 32-bit addition, register edx is zero-extended (out to 64 bits). This zero-extension is performed automatically in the AMD64 instruction set architecture.

In line nine of Code Listing Four 600, the loop begins. In line ten, a 32-bit addition is performed to add the value of the stride variable (stored in register r9d) to the offset-adjusted value of integer i. In line eleven, the 64-bit offset-adjusted value of integer i (stored in rdx) is multiplied by four. Four is a scale factor used in this instance because each element of array a is a four-byte (32-bit) integer. The product of this multiplication is then added to the address for array a (stored in rcx). The sum of this addition operation is used as the input address to the memory reference portion ("dword ptr") of the cmp instruction. The dword ptr instruction returns a pointer to the correct element of array a. The cmp instruction compares the referenced element of array a to the value for integer ref (stored in 32-bit register r8d). In line twelve, the jl instruction either terminates the loop or returns the instruction flow to the top of the loop (line nine), based on the outcome of the cmp instruction.

Table 1 illustrates example values for integer i (stored in registers edx/rdx) as well as values for indexes into array a that may be generated during an execution of the code shown in Code Listing Four 600. Numeric values in Table 1 are indicated in hexadecimal notation.

TABLE 1

| Original value for integer i | Integer i after offset | Integer i after offset and zero extension | Referencing a[i] using of address of a[ ] after offset (0000.0000.4000.0000) plus integer i after offset and zero extension |
|---|---|---|---|
| 0000.0000 | 8000.0000 | 0000.0000.8000.0000 | 0000.0000.c000.0000 |
| 7fff.ffff | ffff.ffff | 0000.0000.ffff.ffff | 0000.0001.3fff.ffff |
| 8000.0000 | 0000.0000 | 0000.0000.0000.0000 | 0000.0000.4000.0000 |

For the example of Table 1, the original address for array a is 0x0000.0000.c000.0000. After subtracting the offset of 0x80000000 from the address for array a (as shown in line seven of Code Listing Four 600), the offset address for array a is 0x0000.0000.4000.0000. In the first row in the first column, the original value for integer i is shown as 0x0000.0000. The second column in the first row shows the value for integer i after the offset (0x80000000) is added to it, as performed in line eight of Code Listing Four 600. The third column in the first row shows integer i as a 64-bit value after the zero extension of line eight of Code Listing Four 600 is performed. The fourth column in the first row shows the index into array a that is calculated in line eleven of Code Listing Four 600. The second and third rows in Table 1 show analogous data for starting values of integer i of 0x7fff.ffff and 0x8000.0000, respectively.

From an original address for array a of 0x0000.0000.c000.0000 and without offsetting as shown in Code Listing Four 600, it is possible to use a 32-bit signed integer to address from 0x0000.0000.4000.0000 to 0x0000.0001.3ffff.ffff. Table 1 illustrates that, after the offsets shown in Code Listing Four 600 are performed, this same address range is still accessible.

Figure 7:
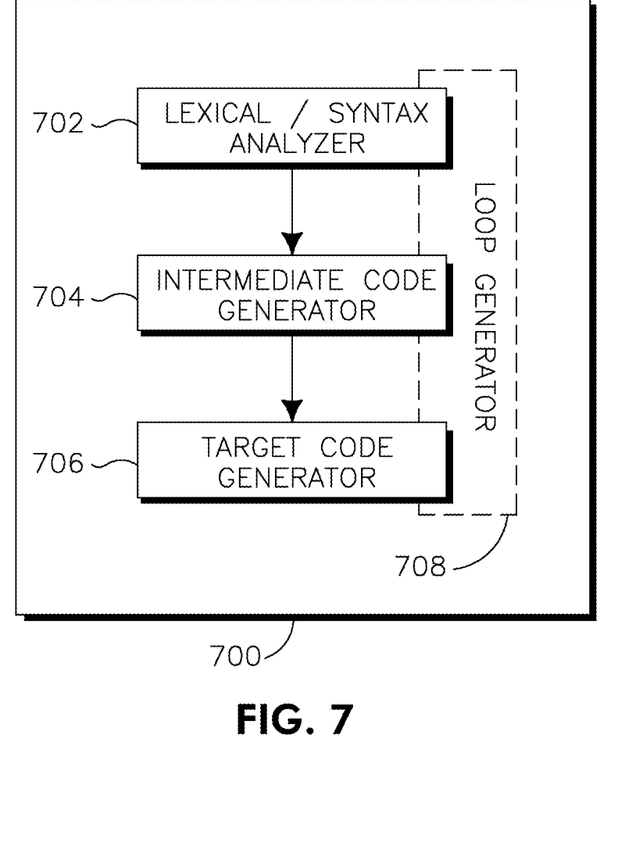
FIG. 7 shows an example architecture for a compiler program capable of implementing the method of FIG. 4.

FIG. 7 shows an example architecture of a compiler program 700 configurable to implement the methods and features described above with reference to FIGS. 4-6. The compiler program 700 includes a lexical/syntax analyzer module 702, an intermediate code generator module 704, and a target code generator module 706. The lexical/syntax analyzer module 702 may perform functionality such as tokenizing input source code, parsing the tokenized code, and identifying semantic errors in the input source code. The intermediate code generator module 704 generates an intermediate representation of the output of the lexical/syntax analyzer module 702. The intermediate representation is a machine- and language-independent version of the input source code. The intermediate code generator module 704 may generate, for example, a parse tree, abstract syntax tree, or one or more other data structures. The target code generator module 706 converts the intermediate representation into the target computer code that is the final output of the compiler program 700. Loop generator module 708 is configurable to implement the method 400 of FIG. 4. The loop generator module 708 may be a sub-module within any one or any combination of the other modules 702, 704, 706 or may be a stand-alone module within the compiler program 700. Each of the modules 702, 704, 706, 708 may be realized as an executable program, a function, a method call, a procedure, a routine or sub-routine, an object, a data structure, or one or more processor-executable instructions.

The compiler program 700 of FIG. 7 is provided purely by way of example. In addition to the compiler program 700 of FIG. 7, the method of FIG. 4 may be implemented in a compiler of having a different architecture from that of compiler program 700 or in a program of a different type, such as a just-in-time (JIT) compiler, a bytecode compiler, an interpreter, or any other program.

Figure 8:
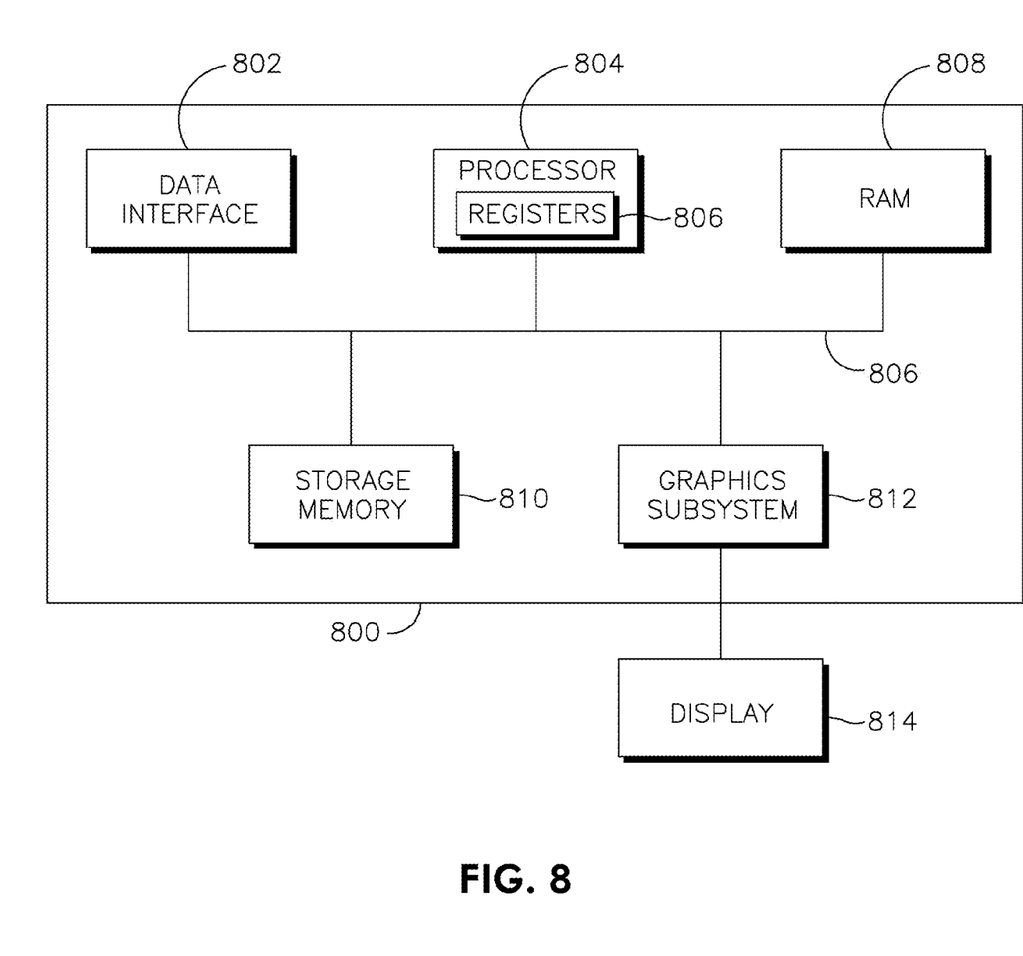
FIG. 8 shows an example computing device capable of implementing the method of FIG. 4.

FIG. 8 shows an example computing device 800 that is configurable to implement the methods and features described above with reference to FIGS. 4-7. The computing device 800 includes a processor 804, and may also optionally include a data interface 802, RAM 808, storage memory 810, graphics subsystem 812, and display device 814.

The processor 804 includes registers 806. The processor 804 may include one or multiple cores. The registers 806 may be implemented as one or more RAM devices such as D-RAMs or S-RAMs, or other type of memory devices. The processor 804 may additionally include circuitry (not depicted) configurable to load, store, and execute instructions, and perform integer and floating point calculations. The processor 804 may include a single core or multiple cores. The processor 804 may be configurable to store and read data from the registers 806 and execute instructions that implement the method 400 of FIG. 4 and/or implement the functionality of the compiler program 700 of FIG. 7.

The computing device 800 may receive input data through data interface 802. The data interface 802 may be, for example, a communications port, wired or wireless network interface, or an interface such as Universal Serial Bus (USB) for receiving input from a user (not depicted) or an external computer-readable medium (not depicted). The computing device 800 may include additional data interfaces (not depicted). The storage memory 810 may be, for example, a hard disk drive, flash memory, or device capable of reading data from at least one non-volatile computer-readable medium. The RAM 808, the storage memory 810, and/or other computer-readable media (not depicted) within computing device 800 may be configurable to store instructions and/or data related to the execution of the method 400 of FIG. 4 and/or the compiler program 700 of FIG. 7.

The graphics subsystem 812 is configurable to generate display data related to the execution of the method 400 of FIG. 4 and/or the compiler program 700 of FIG. 7. Display device 814 is capable of rendering the data sent from the graphics subsystem 812 in a visual format. The display device 814 may be, for example, a monitor or television display, a plasma display, a liquid crystal display (LCD), or a display based on technologies such as front or rear projection, light emitting diodes (LEDs), organic light-emitting diodes (OLEDs), or Digital Light Processing (DLP). The display device 814 may be included within an external casing that encloses the computing device 800, or may be implemented externally to the computing device 800 and coupled to the computing device 800 via one or more wired or wireless interfaces.

The computing device 800 may be a general purpose computer or special-purpose device for data processing as described above with reference to FIGS. 4-7. Referring to both FIG. 4 and FIG. 8, at least one processor (such as the processor 804 of FIG. 8) may generate output code (step 414) and store the output code in one or more computer-readable media (such as the RAM 808, storage memory 810, or other computer-readable medium (not depicted)). In an instance where the output code is not machine code (such as where the output code is, for example, assembly code), the processor 804 may further process the output code to generate corresponding code in an executable machine code format. The processor 804 of the computing device 800 may then execute the stored output code. Alternatively or additionally, one or more other computing devices (not depicted) that include processors may receive and execute (after further processing, if necessary) the stored output code. The stored output code may be transferred to the other computing devices via one or more computer media, via one or more wireless networks, or via any other mechanism for electronic data transfer.

Although examples are provided above with respect to FIGS. 1-8 with reference to AMD64 assembly language, the principles described above are applicable to other assembly languages. Additionally, the principles described above are not limited to use with the AMD64 architecture, but may be employed with any processor architecture that includes one or more 64-bit registers. Additionally, the principles described above are not limited to use with 64-bit architectures, but may also be employed, mutatis mutandis, in 128-bit architectures.

Although features and elements are described above in particular combinations, each feature or element can be used alone without the other features and elements or in various combinations with or without other features and elements. The sub-elements of the methods and features as described above with respect to FIGS. 4-8 may be realized in any order (including concurrently), in any combination or sub-combination. Sub-elements described with reference to any single FIGURE may be used in combination with the sub-elements described with reference to any other Figure or combination of other Figures.

What is claimed is:

1. A method for generating output computer code that includes instructions for adding a first integer of N bits to a second integer of M bits, wherein the second integer is a signed integer and wherein N is greater than M, the method comprising:

identifying a first loop construct in source computer code, wherein the first loop construct includes adding the first integer and the second integer;

generating the output computer code based on the source computer code, wherein the output computer code includes at least one instruction which, when executed, performs the following:

storing an offset value in an N bit length register, wherein:

the offset value is based on a length of the second integer and is used to preserve wraparound semantics for the second integer; and M and the offset value are any one of: M is 32 and the offset value is 0x80000000, M is 16 and the offset value is 0x8000, or M is 8 and the offset value is 0x80;

subtracting the offset value from a first register that corresponds to the first integer;

adding the offset value to a second register that corresponds to the second integer;
performing a zero extension to the second register to convert the second integer to an N bit length; and
executing a second loop construct, wherein the second loop construct includes an N-bit addition of a value in the first register and a value in the second register.

2. The method of claim 1, wherein N is 64.

3. The method of claim 1, further comprising:
executing one or more instructions to store the output computer code in at least one computer-readable medium; and
executing the output computer code stored in the at least one computer-readable medium.

4. The method of claim 1, wherein the output computer code is in an assembly language format or a machine code format.

5. An apparatus for generating output computer code that includes instructions for adding a first integer of N bits to a second integer of M bits, wherein the second integer is a signed integer and wherein N is greater than M, the apparatus comprising:
a processor configured to:
identify a first loop construct in source computer code, wherein the first loop construct includes adding the first integer and the second integer; and
generate the output computer code based on the source computer code, wherein the output computer code includes at least one instruction which, when executed, performs the following:
storing an offset value in an N bit length register, wherein:
the offset value is based on a length of the second integer and is used to preserve wraparound semantics for the second integer; and
M and the offset value are any one of: M is 32 and the offset value is 0x80000000, M is 16 and the offset value is 0x8000, or M is 8 and the offset value is 0x80;
subtracting the offset value from a first register that corresponds to the first integer;
adding the offset value to a second register that corresponds to the second;
performing a zero extension to the second register to convert the second integer to an N bit length; and
executing a second loop construct, wherein the second loop construct includes an N-bit addition of a value in the first register and a value in the second register.

6. The apparatus of claim 5, wherein N is 64.

7. The apparatus of claim 5, further comprising a computer-readable medium, wherein the processor is further configured to:
execute one or more instructions to store the output computer code in the computer-readable medium; and
execute the output computer code stored in the computer-readable medium.

8. The apparatus of claim 5, wherein the output computer code is in an assembly language format or a machine code format.

9. A non-transitory computer-readable medium storing a set of instructions for execution by a processor, the set of instructions comprising:
an identifying segment for identifying a first loop construct in source computer code, wherein the first loop construct includes an addition of a first integer of N bits to a second integer of M bits, wherein the second integer is a signed integer and wherein N is greater than M;
a generating segment for generating output computer code based on the source computer code, wherein the output computer code includes at least one instruction which, when executed, performs the following:
storing an offset value in an N bit length register, wherein:
the offset value is based on a length of the second integer and is used to preserve wraparound semantics for the second integer; and
M and the offset value are any one of: M is 32 and the offset value is 0x80000000, M is 16 and the offset value is 0x8000, or M is 8 and the offset value is 0x80:
subtracting the offset value from a first register that corresponds to the first integer;
adding the offset value to a second register that corresponds to the second integer;
performing a zero extension to the second register to convert the second integer to an N bit length; and
executing a second loop construct, wherein the second loop construct includes an N-bit addition of a value in the first register and a value in the second register.

10. The non-transitory computer-readable medium of claim 9, wherein N is 64.

11. The non-transitory computer-readable medium of claim 9, further comprising:
a first executing segment for executing one or more instructions to store the output computer code in a second computer-readable medium; and
a second executing segment for executing the output computer code stored in the second computer-readable medium.

* * * * *